(12) United States Patent
Saxton et al.

(10) Patent No.: US 6,324,996 B1
(45) Date of Patent: Dec. 4, 2001

(54) CORNER ASSEMBLY FOR RAILWAY BOXCAR DOORWAY

(75) Inventors: Gregory J. Saxton, Gresham; Andrew A. Baker, Portland, both of OR (US)

(73) Assignee: Gunderson, Inc., Portland, OR (US)

( * ) Notice: Subject to any disclaimer, the term of this patent is extended or adjusted under 35 U.S.C. 154(b) by 0 days.

(21) Appl. No.: 09/588,862

(22) Filed: Jun. 6, 2000

(51) Int. Cl.$^7$ .............................. B61D 3/08; B61D 17/04; B62D 27/02
(52) U.S. Cl. ........................ 105/355; 105/411; 105/396; 296/29; 403/403; 49/504
(58) Field of Search ..................................... 105/355, 411, 105/413, 396, 397, 401, 329.1, 332, 333; 296/29, 181, 193, 202, 209, 146.9, 30; 403/403, 382; 49/504

(56) References Cited

U.S. PATENT DOCUMENTS

| | | | |
|---|---|---|---|
| 4,889,055 | * 12/1989 | Jamrozy | 105/355 |
| 5,054,403 | * 10/1991 | Hill et al. | 105/419 |
| 5,088,417 | * 2/1992 | Richmond et al. | 105/411 |
| 5,802,984 | * 9/1998 | Thoman et al. | 105/404 |

OTHER PUBLICATIONS

Gunderson, Inc., Boxcar Side Assembly, Jul. 13, 1998.

* cited by examiner

Primary Examiner—Joseph D. Pape
Assistant Examiner—Greg Blankenship
(74) Attorney, Agent, or Firm—Chernoff, Vilhauer, McClung & Stenzel, LLP

(57) ABSTRACT

A structural assembly defining a corner of a doorway for a railway boxcar in which a square-cornered doorway opening is provided and yet stress concentrations are avoided. A corner connecting member interconnects upright and horizontal doorway frame structures, but instead of including an angular intersection of vertical and horizontal surfaces defining the doorway opening, the corner member includes an arcuate concave connecting surface extending between the upright and horizontal surfaces defining the doorway opening. The arcuate concave connecting surface is located outside the doorway opening and extends around the location where the vertical and horizontal surfaces would intersect, so that there is no angular intersection to concentrate stresses. An insert fits matingly along the arcuate concave connecting surface and has an inside corner defined by surfaces that are located to extend the vertical and horizontal surfaces and define the corner of the doorway opening. The insert is held in place by a single fastener that avoids concentration of stresses in the insert.

11 Claims, 6 Drawing Sheets

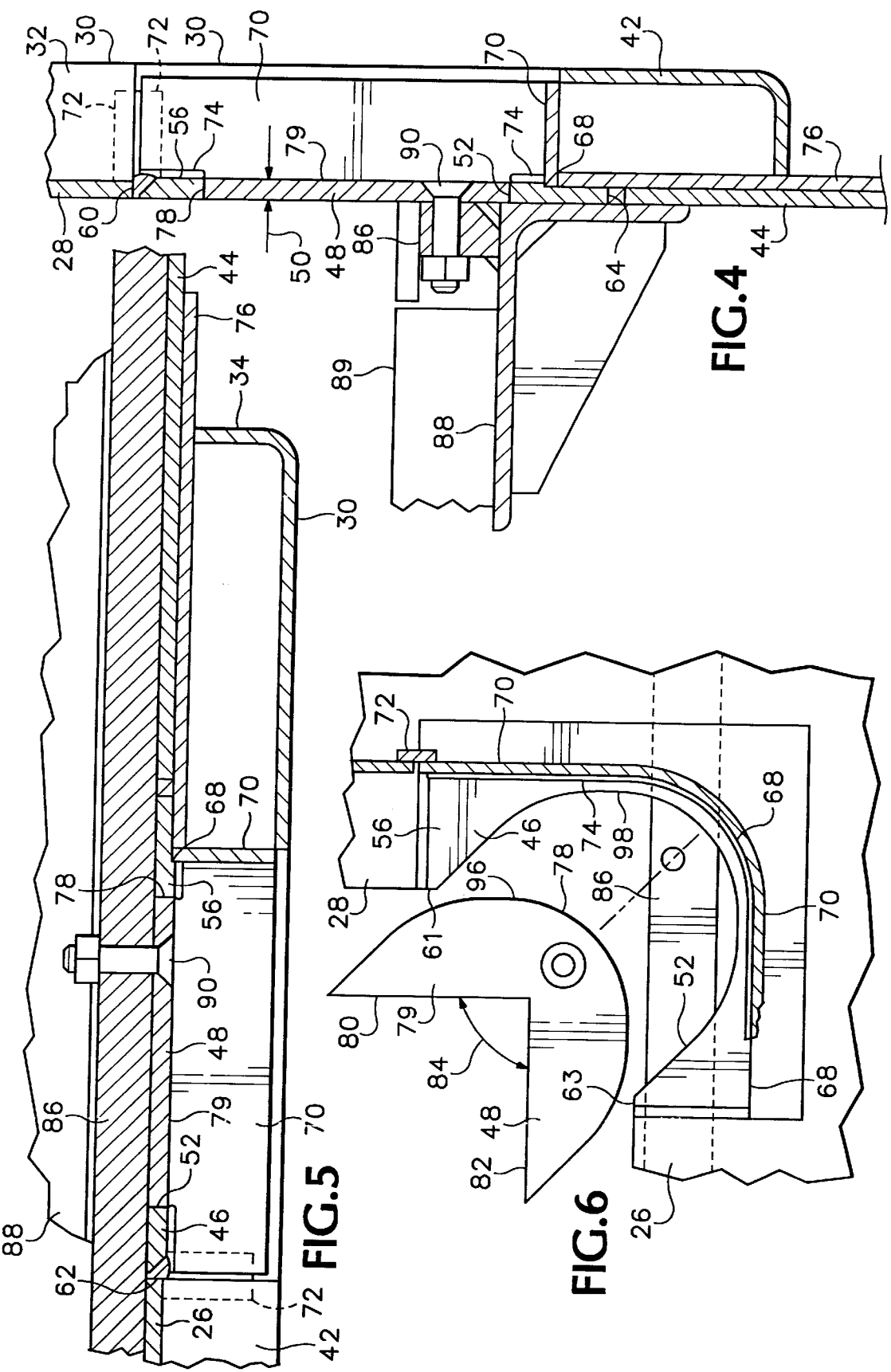

CORNER ASSEMBLY FOR RAILWAY BOXCAR DOORWAY

BACKGROUND OF THE INVENTION

The present invention relates to railroad cars, and in particular, to structures defining doorway openings in boxcars.

Railway boxcars are made with two general types of doorway closures. The first is a simple sliding door arrangement in which the boxcar door slides along a track into a position that closes a doorway opening, where it is kept in place by latching the door to the car body structure that surrounds the doorway opening. The second type of boxcar door is a "plug door" arrangement in which the boxcar door is mounted on a track and first rolls longitudinally of the car body into a position aligned with the doorway opening, then moves laterally inward into a sealing position in the doorway when a latching mechanism is operated.

For a plug door, the railway boxcar structure that defines the doorway typically provides a sealing surface around the doorway perimeter, facing laterally outward toward the plug door. The plug door typically has a gasket or other sealing device extending along the perimeter of its interior face to press against the sealing surface.

Doorways for some previously-known boxcars with plug door assemblies have had square corners. This construction creates difficulties, as forces carried through the car body structures concentrate in the car structures defining the corners of such doorway openings and, over time, may lead to stress fractures in the car structure at the doorway corners. The sealing surface of the doorway is typically located on a portion of an inner doorpost, where it is vulnerable to being damaged by equipment used to load or unload the car. Such damage also results in stress concentrations leading to cracks which may progress into a side sill of the car.

In response, boxcar manufacturers designed plug door assemblies with rounded corner gussets in the doorways. Because of the curved surfaces of such rounded corners, there is no point at which stresses can concentrate excessively.

Rounded corners, while improving resistance to damage, diminish the available doorway width at the threshold. If the rounded doorway opening is enlarged to leave as much clear width at the threshold as in a square-cornered doorway, then a larger, heavier door is required, necessitating heavier framing structure surrounding the doorway.

What is desired, then, is a way to achieve required usable doorway width without increasing total doorway width, yet avoid stress concentrations in doorway corners.

BRIEF SUMMARY OF THE INVENTION

The present invention provides an answer to the aforementioned shortcomings of previously known boxcar doorways. Broadly, the present invention provides for corner assemblies that define a doorway opening free from intruding gussets yet carrying structural loads through connections using arcuate surfaces to avoid stress concentrations in the structures defining the corner.

In one preferred embodiment of the invention a railroad car doorway opening for a plug door is defined by a corner connecting member for interconnecting a doorway threshold and a vertical doorway side post, with the corner connecting member including a part of the plug door sealing surface, and a corner insert that fits together with the corner connecting member providing another part of the door sealing surface and defining an angular corner of the doorway opening. The corner connecting member includes a concave connecting surface that extends between the sill and the side post and is spaced outwardly away from the doorway opening, and the corner insert has a convex margin whose shape corresponds to the shape of the connecting surface. The corner insert also has two marginal surfaces that respectively define portions of vertical and horizontal boundaries of the doorway opening and intersect to define an angular corner.

In one embodiment of the invention the corner connecting member has a concave, generally horseshoe-shaped connecting surface. The concave space defined by the connecting surface is filled by a corner insert with a matching convex outer surface and with inner surfaces that form the requisite angular corner to the boxcar doorway.

It is an important feature of one embodiment of the invention that the corner insert which provides a portion of the door seal face and defines a square corner interior angle in the corner of the doorway is attached to the car body structure at a single point, but not to the corner connecting member. With this configuration, significant stresses are not transmitted between the corner connecting member and the insert.

It is another feature of one preferred embodiment of the invention that concave surfaces and mating convex surfaces of the corner connecting member and the corner insert, respectively, are shaped to prevent the corner insert from rotating about the single fastener.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 4 is a sectional view of the corner assembly shown in FIG. 3, taken along line 4—4 of FIG. 3 at a further enlarged scale.

FIG. 5 is a sectional view of the corner assembly shown in FIG. 3, taken along line 5—5 of FIG. 3 at a further enlarged scale.

FIG. 6 is an elevational, partly exploded view of a detail of the corner assembly shown in FIG. 3, taken in the same direction as FIG. 3, at a further enlarged scale.

DETAILED DESCRIPTION OF THE PREFERRED EMBODIMENT

Figure 1:
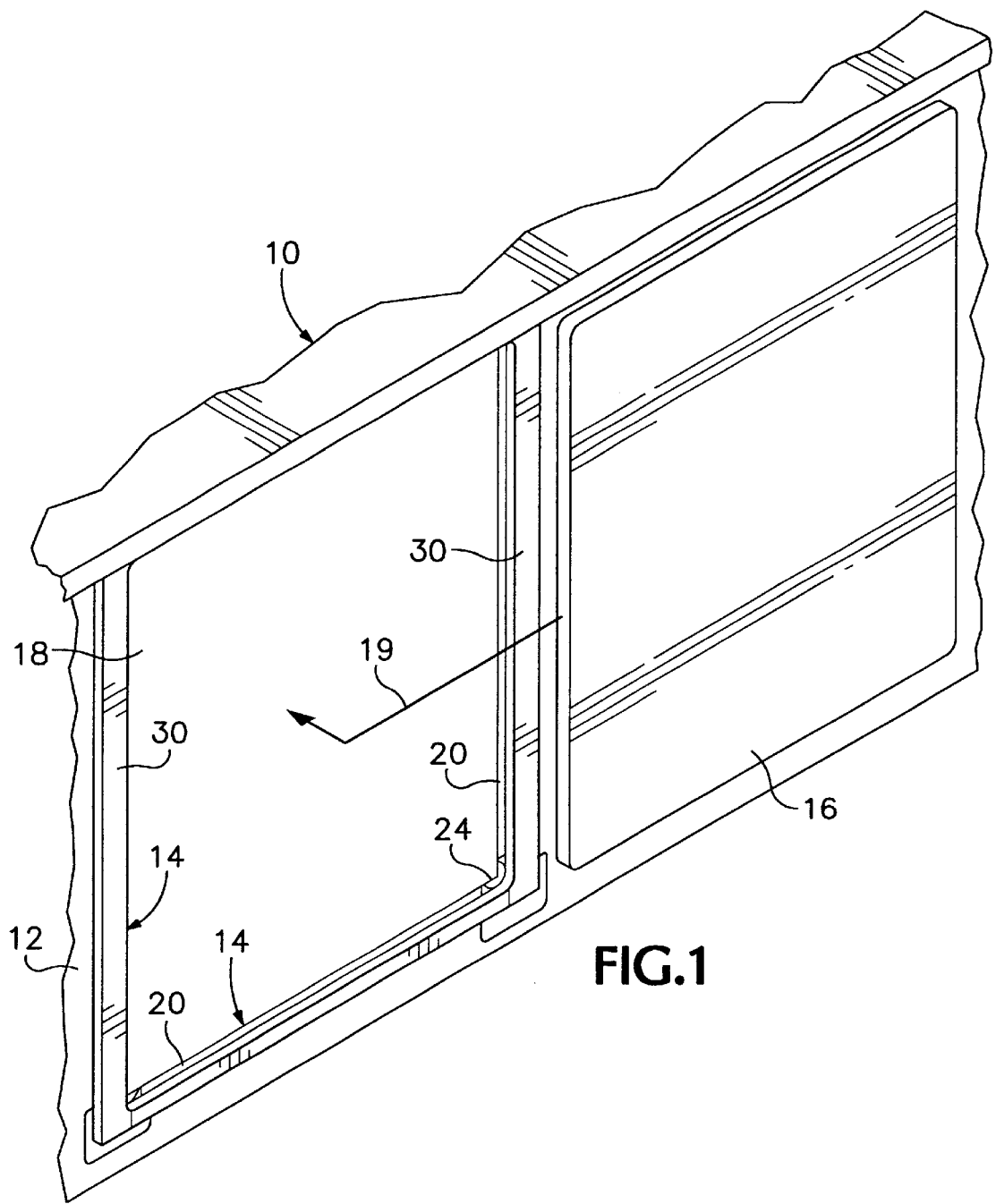
FIG. 1 is a simplified isometric view of a portion of a side of a railway boxcar including a "plug" type boxcar door and including a square-cornered doorway, incorporating a structure embodying the present invention.
Figure 2:
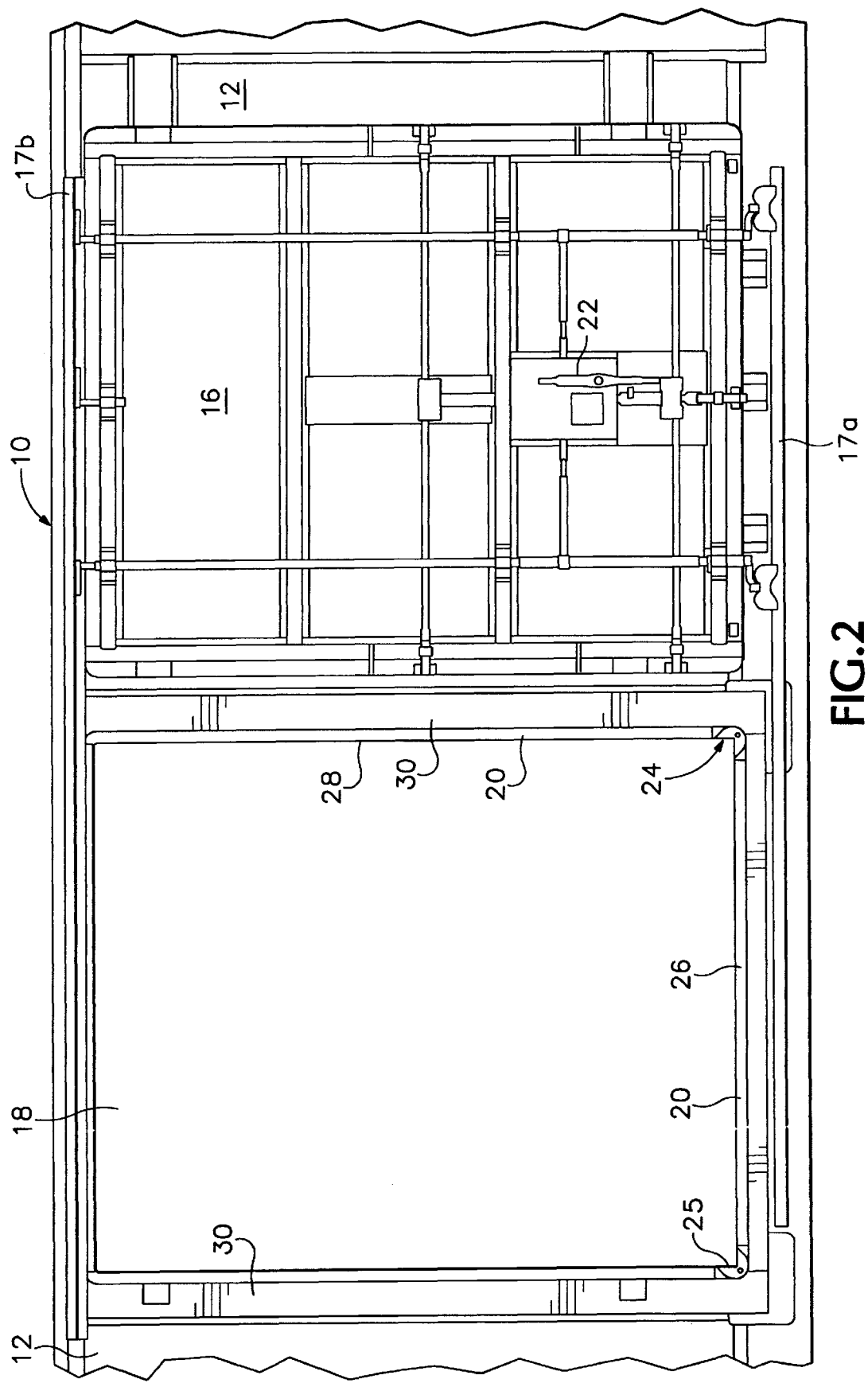
FIG. 2 is an elevational view, at an enlarged scale, taken from the outside of the portion of a boxcar shown in FIG. 1

Referring to FIGS. 1 and 2, a railway boxcar has a car body 10 of steel, including upright longitudinal sidewalls 12, shown simplified, and a doorway frame structure 14 for a "plug" door 16. The door 16 is supported on tracks 17a and 17b extending along the sidewall 12 and rolls longitudinally of the car body 10 into position before a doorway opening 18, where it is moved laterally inward by a conventional door latching mechanism, as indicated by the arrow 19, to bear against an outwardly facing doorway seal surface 20 surrounding the doorway opening 18. The seal surface 20 is preferably generally planar and is located on the structures of the boxcar that define the doorway opening 18, to provide an adequate surface against which the plug door gasket can press. When the door is moved inward, a seal is provided by a door gasket (not shown) mounted on the inwardly-facing surface of the plug door 16. Such a gasket is urged against the seal surface 20 by the latching mechanism when a door closing crank 22, seen in FIG. 2, is turned.

As shown at a somewhat larger scale in FIG. 2, a corner assembly 24 embodying the present invention interconnects a horizontal doorway threshold member 26 with a vertical doorway post including an inner doorway side post 28 and an outer doorway side post 30. This structural arrangement carries forces around the doorway opening 18 and avoids stress concentrations from carrying loads, while preserving an angular doorway corner free from obstruction by intruding rounded corner connections. A corner assembly 25 is located at the opposite one of the lower corners of the doorway opening 18. Because it is identical with the corner assembly 24, but for its mirror-opposite orientation, the corner assembly 25 will not be further described.

Figure 3:
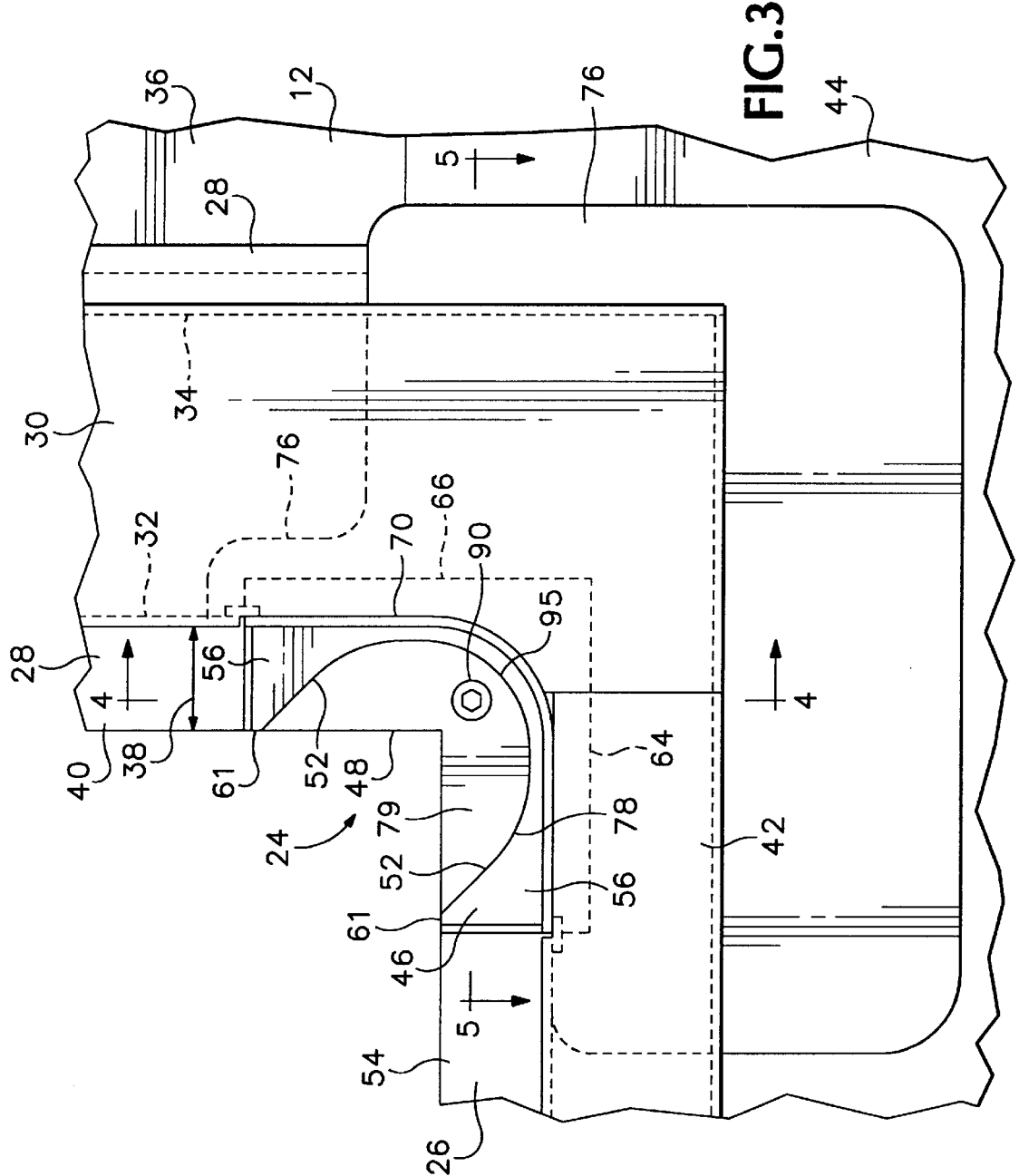
FIG. 3 is an elevational view taken in the same direction as FIG. 2, showing a detail of the doorway structure shown in FIG. 2 at a further enlarged scale.

As shown in FIGS. 2, 3, and 5, the outer doorway post 30 is in the form of a channel extending vertically and with its flanges 32 and 34 facing inwardly toward the inner post 28. The inner post 28 is in the form of a plate extending vertically and is of thicker material than the sheet material 36 of the sidewall 12, which overlaps and is joined to the inner post 36, as by welding. A portion of the inner post 28 extends a small distance 38, such as 1-⅝ inches, toward the doorway opening 18 beyond the closer flange 32 of the outer post 30 and includes the upright, or generally vertical, portion 40 of the door seal surface 20.

A doorway sill 42 extending horizontally along the car body 10 beneath the doorway opening 18 is in the form of a channel with its flanges extending laterally inward toward the side sill 44 of the car.

Figure 7:
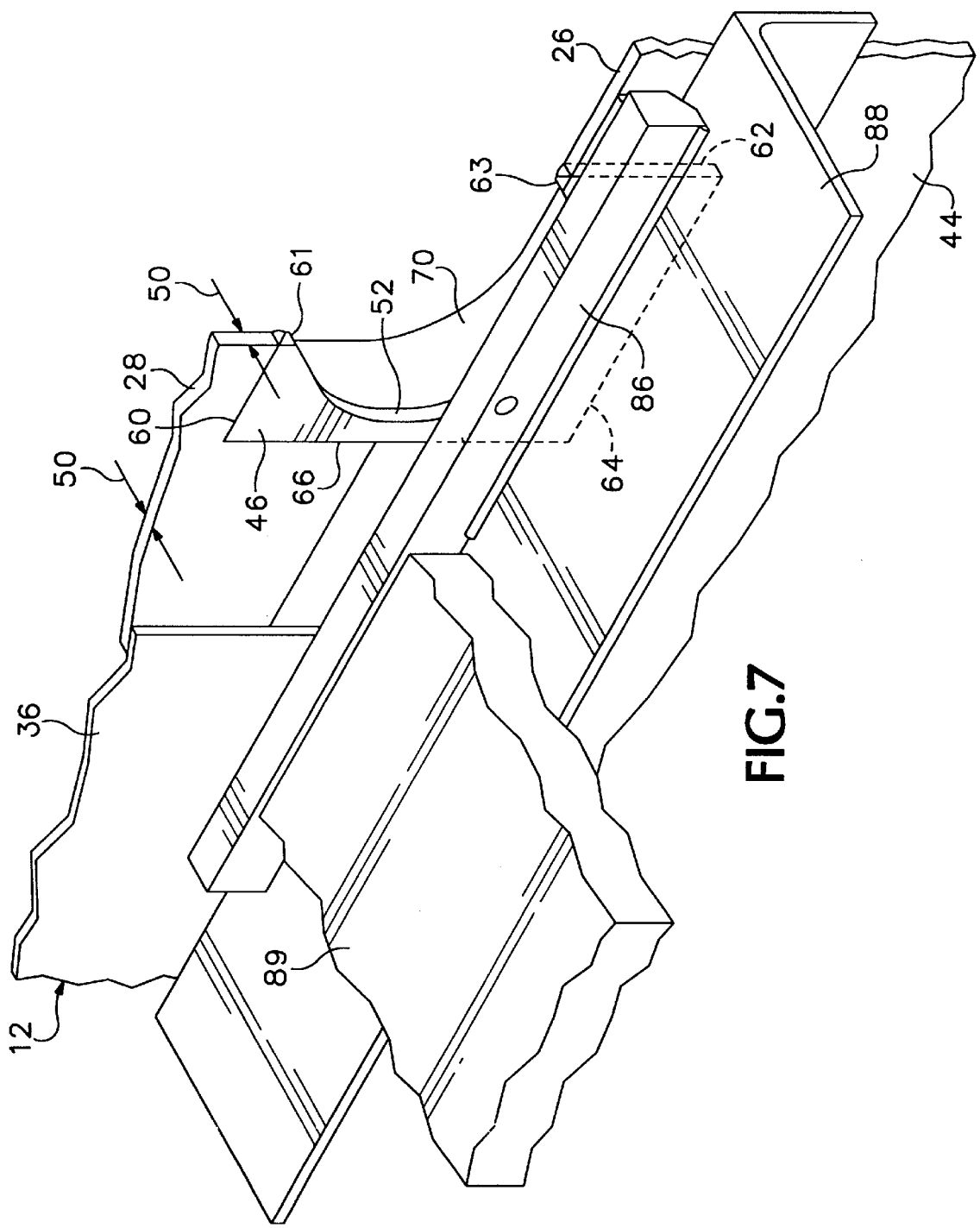
FIG. 7 is an isometric view of a lower corner area of the boxcar doorway frame structure shown in FIG. 3, taken from inside the car body, but without the corner insert of the corner assembly.

Referring also to FIGS. 4, 6 and 7, the corner assembly 24 includes a corner connecting member 46 and a corner insert 48, both generally planar members, with a of suitable thickness 50 of, for example, 7/16 inch, in one embodiment of the invention. Both are made, in a preferred embodiment, as castings of ASTM A148 Grade 90-60 steel, to have sufficient strength to resist being damaged by lift trucks or other equipment during loading and unloading, although each could be made of other materials and by methods other than casting. The corner connecting member 46 has a roughly L-shaped configuration, modified on the inner side to include a recessed, horseshoe-shaped opening defined by a concave connecting surface 52 that is spaced outwardly apart from, but faces toward, the doorway opening 18. Thus, the inwardly facing margins of the threshold 26 and the doorway post 28 that define the doorway opening 18 include no sharp discontinuities or small radius shapes. Stress concentrations in the connecting structure are avoided by allowing stresses to distribute themselves along the concave arcuate connecting surface 52 of the margin of the corner connecting member 46 attached to and interconnecting the doorway side posts 28, 30 with the doorway threshold member 26, door sill 42, and car side sill 44.

A portion of the side sill 44 extends upwardly a small distance, such as about 1-⅝ inches above the door sill channel 42, and serves as the threshold member 26. An outwardly facing surface of the threshold 26 includes the horizontally extending portion 54 of the door seal surface 20. Referring to FIGS. 3, 4, 5, 6 and 8, a flat surface 56 defined on the corner connecting member 46 is coplanar with both the vertically-extending and horizontally-extending portions 40 and 54 of the door seal surface 20 and forms a part of the door seal surface 20.

The corner connecting member 46 is chamfered at surfaces 58 to provide room for weld material, and the upper end 60 of the corner connecting member 46 is welded to the inner doorway side post 28, with a short margin surface 61 aligned with the inner doorway side post 28, while the margin of the doorway side 62 of the corner connecting member is welded to the upwardly-extending threshold 26 portion of the side sill plate 44, with a short margin surface 63 aligned with the threshold 26. The bottom margin 64 and outer or sidewall margin 66 of the corner connecting member 46 are also welded to the inner side post 28 and to the side sill plate 44. Thus the concave connecting surface 52 interconnects the margins, of the vertically extending part 40 and the horizontally extending part 54 of the door seal surface 20, defining the doorway opening 18.

Figure 8:
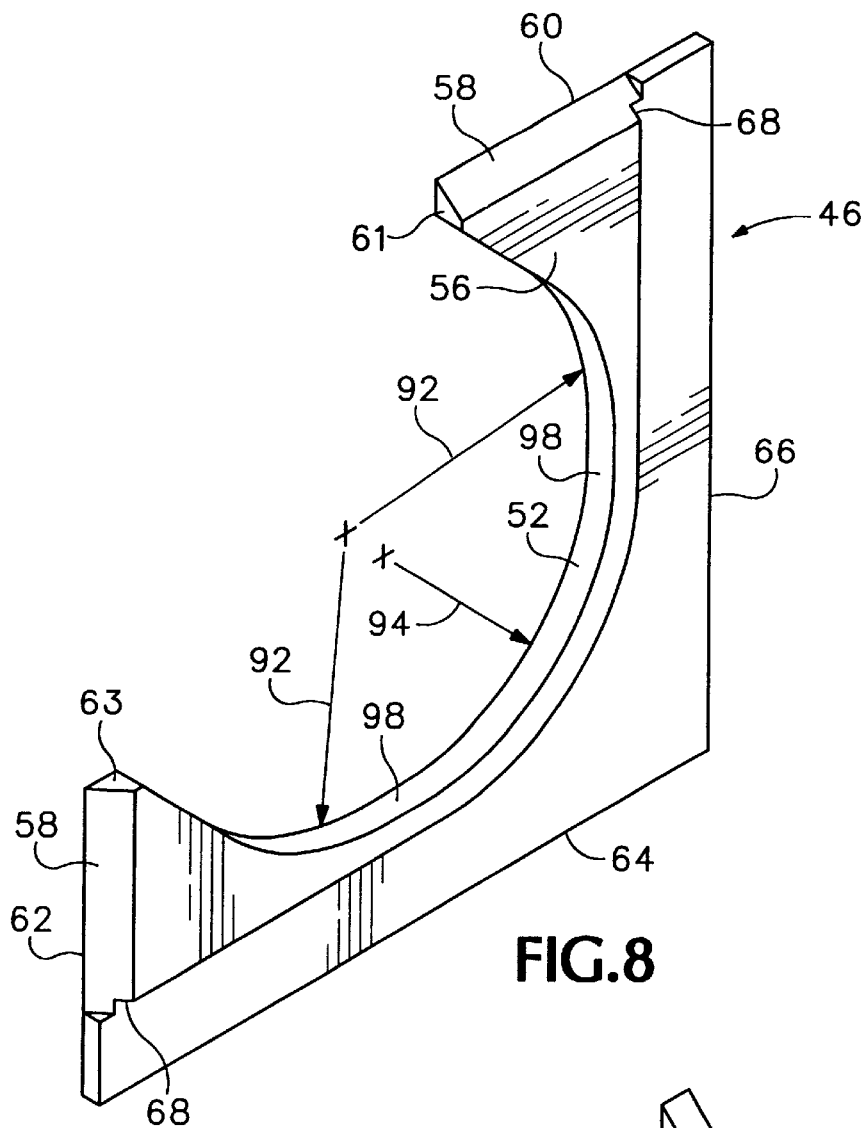
FIG. 8 is an isometric view, at an enlarged scale, of the corner connecting piece shown in FIG. 3, with the corner insert removed so that the concave connecting surface of the corner piece is shown.
Figure 9:
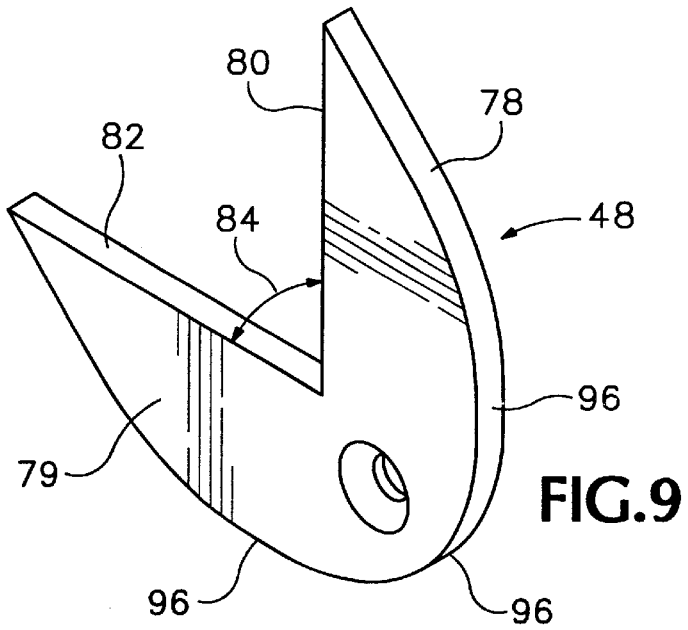
FIG. 9 is an isometric view of the corner insert depicted in FIG. 3, seen from the upper right, showing both a mating convex surface and the angular intersection of vertical and horizontal surfaces that form the doorway corner.

The corner connecting member 46 includes a raised or thicker portion bounded by an upstanding or protruding locating shoulder 68 extending from the upper end 60 to the doorway side 62 with an arcuate shape shown best in FIGS. 6 and 8. This locating shoulder 68 facilitates the attachment of a metal reinforcement piece or strap 70 welded in place on the corner connecting member 46 as shown in FIGS. 3–6.

A short bridge strap 72 interconnects the reinforcing strap 70 to the outer doorway side post 30 at the upper end 60 of the corner connecting member 46 as shown in FIGS. 4 and 5. The reinforcement strap 70 extends downward along the locating shoulder 68 from the inner flange 32 of the outer side post 28, and thence curvingly toward the upper flange of the doorway sill channel 42. Another bridge strap 72 connects the reinforcing strap 70 to the upper flange of the doorway sill channel flange. The reinforcing strap 70 is welded to the corner connecting member along the locating shoulder 68, as shown at 74.

A lower doorway corner doubler plate 76 is located alongside and is welded to the outer side of the side sill plate 44, overlapping the portion of the corner connecting member 46 located outside the reinforcing strap 70. Part of the doubler plate 76 is located between the outer corner post 30 and the lower end portion of the inner corner post 28 to reinforce the interconnection of the inner and outer doorway side posts 28, 30 with the side sill 44 and thus to strengthen the structure defining the doorway opening 18.

The corner insert 48 has a convex outer margin surface 78 that corresponds in shape and mates loosely adjacent to the concave connecting surface 52 of the corner connecting member 46. The corner insert 48 thus fits together with the corner connecting member 46 with only a small gap that can be filled with caulking material, when the corner assembly 34 is assembled. The corner insert 48 has a planar face 79 that is a portion of the door seal surface 20 and also has two inner margin surfaces 80 and 82 that face toward the doorway opening 18 and are aligned respectively with the margins of the inner doorway post 28 and the doorway threshold member 26, preferably intersecting each other in a right angle 84, thereby forming a square corner of the doorway opening 18.

The corner insert 48 is held in place by fastening it to a supporting member such as a threshold reinforcing bar 86 extending horizontally along the bottom of the doorway opening 18 and extending further behind the corner connecting member to the inner doorway post 28. As seen in FIG. 4, the threshold reinforcing bar 86 extends along and is welded to a floor support angle 88 located on the inner side of the side sill plate 44 where a floor 89, shown only partially, is supported. As seen best in FIG. 7, the threshold reinforcing bar 86 is also welded along its top surface to the inner side of the upper margin or threshold 26 portion of the side sill plate 44, although it is not welded to the inner face of the corner connecting member 46.

The corner insert 48 is preferably attached to the threshold reinforcing bar 86 by a single fastener, such as the bolt 90, shown in FIG. 3 which is countersunk in the flat face 79 of the corner insert 48 so that its head forms a part of the doorway seal surface 20. Impacts of loading ramps, forklifts, or cargo against the corner insert 48 are not directly transmitted into the structure interconnecting the doorway side posts 28, 30 with the side sill 44, as a result, and a damaged corner insert 48 is easily replaced without affecting the principal load-carrying structures of the corner of the doorway frame 14.

Referring to FIGS. 7 and 8, the concave surface 52 of the corner connecting member 46 and the convex margin surface 78 of the corner insert 48 each include areas defined by two different radii, 92 and 94, so that a slight protrusion 95 exists on the corner insert 48 as defined by the radius 94. A pair of short planar portions 96 are thus included in the convex surface 78, and corresponding planar portions 98 are provided in the concave surface 52. The corresponding non-circular shapes of the convex surface 78 and concave surface 52 prevent the corner insert 48 from rotating within the recess defined in the corner connecting member 46, and are relatively easily formed. It will be understood that other shapes for the mating concave connecting surface 52 and the convex surface 78 could also be used to resist movement of the corner insert 48 relative to the corner connecting member 30, so long as the shapes are designed to avoid concentration of stresses carried through the corner connecting member 30.

The forces developed as a result of lading and train operation are thus carried from the car body 10 to the side sill 44 through ample material of the corner assemblies 24 and 25 of the doorway frame structure 14, yet there is no sharp interior angle in the corner structures to concentrate stresses unduly and lead to premature failure of the material in the corner structures.

The corner assembly 24 acts to distribute loads in the doorway frame 14 along the concave connecting surface 52 of the corner connecting member 46. Because the angular corner 84 of the doorway opening 18 is formed by a separately mounted corner insert 48 that is not connected in a load-carrying way to the doorway posts 28 and 30 or the doorway threshold 26 or sill 42, the angular doorway corner 84 provided by the corner insert 48 does not concentrate stresses in a particular small area of the doorway corner assembly 24. As a result, the corner assembly 24 provides improved structural integrity in the doorway frame structure 14 while defining a square corner of the doorway opening 18. Additionally, by including an angular corner, the doorway frame structure 14 including the corner assemblies 24 and 25 of the present invention defines a doorway opening 18 with its full width available without obstruction at the corners, so that ample space is available without an extra wide opening 18, and amply strong boxcar structure surrounding a doorway of a required useable width can be provided with lesser weight than previously known structures.

The terms and expressions employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A corner assembly, for incorporation in a railroad car doorway frame including a doorway sill and a doorway post defining generally vertical and horizontal boundaries of a doorway opening, the corner assembly comprising:

(a) a corner connecting member having a planar first door seal surface portion defining a door seal plane, said corner connecting member having an upper end and a doorway side, and having a concave connecting surface spaced outwardly away from a corner of the doorway opening defined by extensions of the vertical and horizontal boundaries defined by the sill and the post, said concave surface extending along and intersecting with said first door seal surface portion between said upper end and said doorway side of said corner connecting member; and (b) a corner insert having a second door seal surface portion and a convex margin extending along said second door seal surface portion and shaped appropriately to fit adjacent said concave connecting surface of said corner reinforcement member with said second door seal surface portion located in said door seal plane, said corner insert also having a marginal surface that defines a portion of at least one of said vertical and horizontal boundaries of said doorway opening and thereby defines a part of an angular interior corner.

2. The corner assembly of claim 1 wherein said corner connecting member also has sidewall and bottom margins located opposite said concave connecting surface.

3. The corner assembly of claim 1 wherein said corner insert has two said marginal surfaces each positioned to define a respective portion of one of said vertical and horizontal boundaries of said doorway opening.

4. The corner assembly of claim 1 wherein said corner connecting member includes an upstanding shoulder surface extending along said first door seal surface portion, defining a location for attachment of a reinforcement piece to said corner connecting member.

5. The corner assembly of claim 1 wherein at least one of said upper end and said doorway side is chamfered.

6. A railway boxcar comprising:

(a) an underframe;

(b) a car body carried on said underframe, said car body including a floor and a sidewall that includes a doorway opening;

(c) a vertical side post defining a side of said doorway opening and including a first portion of a door seal surface associated with said doorway;

(d) a threshold member defining a bottom of said doorway opening, said threshold member including a threshold portion of a door seal surface associated with said doorway;

(e) a corner assembly interconnecting and connected both to said side post member and to said threshold member, the corner assembly comprising:

(i) a corner connecting member having a planar first door seal surface portion, said corner connecting member having an upper end and a doorway side, and having a concave connecting surface spaced outwardly away from a corner of the doorway opening defined by extensions of said side and said bottom defined by said side post and said threshold, said concave surface extending along and intersecting with said first door seal surface portion between said upper end and said doorway side of said corner connecting member; and (ii) a corner insert having a planar second door seal surface portion and a convex margin extending along said second door seal surface portion and shaped appropriately to fit adjacent said concave connecting surface of said corner reinforcement member, said corner insert also having a marginal surface that defines a portion of at least one of said side and said bottom of said doorway opening, and thereby defines a part of angular interior corner.

7. The railway boxcar of claim 6 wherein said car body includes a supporting member located adjacent said corner reinforcement member and to which said corner insert is fastened.

8. The railway boxcar of claim 7, including a single fastener attaching said corner insert to said supporting member.

9. The railway boxcar of claim 7 wherein said supporting member is a threshold reinforcing bar extending along said threshold member opposite said threshold portion of said door seal surface.

10. The railway boxcar of claim 6, including a doorway sill, an outer doorway side post, and a reinforcement piece, said reinforcement piece being affixed to and extending along said corner reinforcement member and being connected to said doorway sill and said outer doorway side post.

11. In a railway boxcar, a doorway frame defining a doorway opening, said doorway frame including at least one corner portion defining an angular corner to said doorway opening, and comprising:

(a) a horizontal structural member having a surface that forms a horizontal boundary to said doorway opening and including a first part of a door seal surface;

(b) a vertical structural member having a surface that forms a vertical boundary to said doorway opening and including a second part of a door seal surface;

(c) a corner connecting member fastened to said horizontal structural member and said upright structural member, said corner connecting member being located between said horizontal and upright structural members and interconnecting them with each other and having a concave surface located outside said doorway opening and facing inwardly toward said doorway opening and extending to said vertical boundary and horizontal boundary, respectively.

\* \* \* \* \*